Nov. 7, 1961   P. H. BARRY ET AL   3,008,005
APPARATUS FOR DETECTING ERRORS IN TELEGRAPH SIGNALS
Filed May 28, 1959   4 Sheets-Sheet 1

INVENTORS
PHILIP H. BARRY
ROBERT C. SWANSON
BY R.C. Terry
ATTORNEY

INVENTORS
PHILIP H. BARRY
ROBERT C. SWANSON
BY R.C. Terry
ATTORNEY

INVENTORS
PHILIP H. BARRY
ROBERT C. SWANSON
ATTORNEY

United States Patent Office 3,008,005
Patented Nov. 7, 1961

---

3,008,005
APPARATUS FOR DETECTING ERRORS IN TELEGRAPH SIGNALS
Philip H. Barry, Elk Grove Village, and Robert C. Swanson, Chicago, Ill., assignors to Teletype Corporation, Chicago, Ill., a corporation of Delaware
Filed May 28, 1959, Ser. No. 816,435
17 Claims. (Cl. 178—23)

This invention relates to error detection apparatus, and more particularly to apparatus for indicating errors in multi-element telegraph signals.

In the transmission of telegraph signals, where words are being transmitted over a line, an error in the signal is generally evidenced by garbling of the message or some error in a word in the message. With the transmission of these types of messages, the detection of errors in the message is usually a simple matter. However, if the message consists of merely a series of numerals or the like, such as in the transmission of inventory data or part numbers, an error is not easily detectable by reading the copy received at the receiving station. For this reason, various error detection systems have been devised in the past for indicating errors in telegraph messages, since such messages may be of the type in which an error therein may not be easily detectable.

Some prior art error detecting systems utilize a seven-unit code with a fixed ratio of marking-to-spacing elements, but these systems are undesirable since they are not compatible with the standard five-unit Baudot code transmission systems. Also, some systems which are compatible with the standard five-unit Baudot code have been devised wherein the marking impulses in each path that passes through one level of corresponding elements in a multi-element signal are counted (a horizontal parity check), and a check character is formed therefrom. This type of system has the disadvantage of being rendered ineffective if, for example, tape sensing pins at the transmitter are defective in one level. In this case, since the counter is of the odd-even type, the probability is great that an even number of errors will result on this one level so that no error will be detected at the receiver.

The present invention includes structure for performing the so-called spiral parity check, and a method of detecting errors by the spiral parity check is disclosed in a co-pending application of W. R. Young, Jr., Serial No. 815,712, filed May 25, 1959. As disclosed in the Young application, this method of detecting errors includes counting, on the basis that an even sum equates to zero and an odd sum equates to 1, the marks in the first level of a first character, the second level of the second character, the third level of the third character, and so forth. All five levels are counted simultaneously in this manner so that the probability of detecting an error, which may have been caused by a faulty sensing pin on any given level, is increased while the redundancy represented by the generation and transmission of a check character remains the same as the horizontal parity check system.

An object of the invention is to provide a new and improved error detection apparatus.

A further object of the invention is to provide a new and improved apparatus for detecting errors in multi-element telegraph signals.

A still further object of the invention is to provide an apparatus for detecting errors by the spiral parity check method.

An error detection apparatus for detecting errors in character elements of a telegraph signal, illustrating certain features of the invention, may include a series of bistable circuits equal in number to the number of elements in the signal, and switching means for connecting corresponding elements in successive characters of the signal to a different bistable circuit in the series.

More particularly, when detecting errors in a five-unit Baudot code signal, the invention includes five bistable or flip-flop circuits which may be of the relay type. In one embodiment of the invention, each flip-flop circuit may be switched from one bistable condition to a second bistable condition by the application thereto of a potential representing a marking condition in the signal. Then, upon application of a second marking condition, the bistable circuit will be returned to its original condition. In this manner, an odd-even count of the marking elements in a given path is made. To perform a spiral parity check, the path for pulsing each of the five bistable circuits passes through one level of a first character, a second level of the second character, a third level of the third character, and so forth, and this program of transferring paths is repeated every five characters. In this manner, odd-even counts of the marking elements of each path are made by the flip-flops, and, at the end of a predetermined block of characters which may be the length of a line, the conditions of the flip-flop are impressed onto the output line as a check character. At the receiving end, a similar spiral parity check is made, a check character is formed at the receiver, and this check character is compared to the check character transmitted over the line. Any discrepancy between the two check characters energizes an indicator and, if desired, may stop the receiver and/or notify the transmitter of the error.

A complete understanding of the invention may be obtained from the following description of an error detection apparatus forming a specific embodiment thereof, when read in conjunction with the appended drawings, in which.

Figure 1:
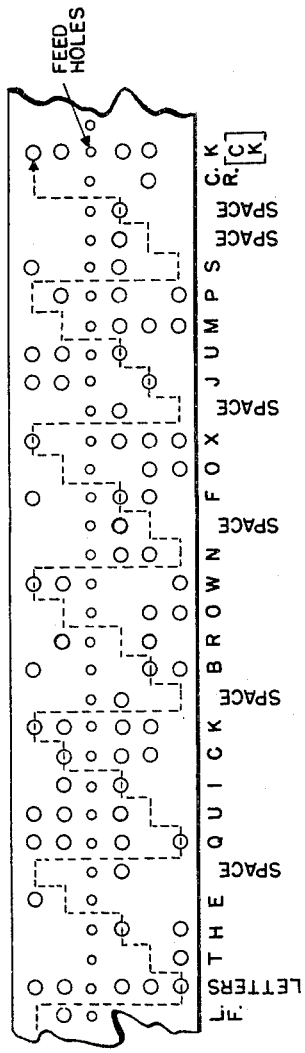
FIG. 1 is a section of a teletypewriter perforated tape containing a sample message and a check character generated in accordance with the principles of this invention by counting marks according to a spiral parity check program that changes in levels between characters.

Refer now to FIG. 1 wherein is shown a portion of a teletypewriter perforated tape having encoded thereon a message in five-unit Baudot code. There are five code levels indicated in FIG. 1 plus a row of feed holes. A check character, designated "K(CK)," is developed by counting the number of marks (punched holes) that appear in five paths like the one path designated by a dashed line. Included in this path are the first level of the first character, the fifth level of the second character, the fourth level of the third character, and so forth. All five levels are counted simultaneously in this manner, while only the single path is shown in FIG. 1. As described in the Young application, the probability of catching an error of the types mentioned which may tend to occur an even number of times on a given level is increased with this spiral parity check of the message. In any event, assuming that the message shown in FIG. 1 includes a complete block of characters, it will be noted that there are thirteen marking conditions in the path shown. As will be described hereinbelow, a first mark will operate a flip-flop stage from an initial to a second bistable state, and a second mark will return the flip-flop to its initial state. Therefore, an odd number of marks in a path will return the flip-flop in its second state so that this level in the check character, K(CK), will be a mark. In a single path shown in FIG. 1, it will be noted that there are thirteen marks. Consequently, since this path is associated with the first level of the check character, a marking condition is shown at this level in the check character. By following the remaining four paths in the spiral parity check, it will be seen that the second, third and fourth code levels will have odd numbers of marking conditions. Consequently, the check character generated by the particular block of characters shown in FIG. 1 will be a character in which the first four levels are marking, and this character is the character "K" in the Baudot code.

GENERAL DESCRIPTION

Figure 2:
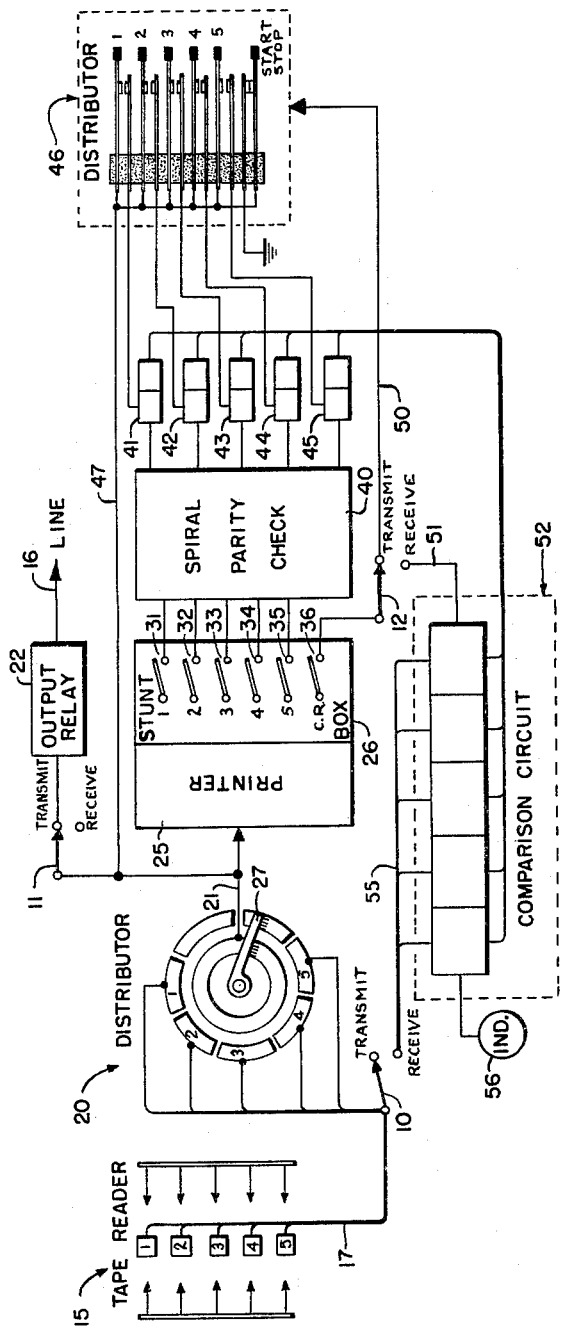
FIG. 2 is a block diagram of a system, which may be the transmitter or receiver in accordance with the setting of certain switches, embodying the invention, and FIGS. 3 to 5, inclusive, when arranged in the manner depicted by FIG. 6, form a schematic diagram of a specific apparatus of the type shown generally in FIG. 2.

Referring now to FIG. 2, a general description of the apparatus embodying the invention is shown therein in block diagram. For the purposes of the present invention, it will be assumed that the spiral parity check is made of each line in the message and that a check character is inserted at the end of such line. Consequently, as each line is transmitted the carriage return (CR) function is selected at the end of the line, and this function initiates the transmission of the check character. In FIG. 2, when a message is to be transmitted, three switches, designated 10, 11 and 12, are placed in their "transmit" positions. When so positioned, a tape is placed in a tape reader 15, in the usual manner, and the message contained therein is transmitted over an output line 16. When the system shown in FIG. 2 is used as a receiver, it will be assumed that the message transmitted over the line is first received and placed in a second tape. At the end of each line in the received signal will be the check character which is likewise placed in the tape. In any event, when the system shown in FIG. 2 is used as the receiver, the switches 10, 11 and 12 are placed in their "receive" positions, and the second tape is placed in the tape reader 15 in the normal manner.

Referring now to the transmission of a signal by the system in FIG. 2, assume that a tape of the type shown in FIG. 1 is placed in the tape reader 15. An output of this tape reader is passed over a cable 17 to a distributor 20 which transmits a serial message over a lead 21 in the normal manner. This message is passed through the switch 11 and is impressed on an output relay 22 which impresses the signal over the output line 16. The serial signal is also impressed on the selector coils (not shown in FIG. 2) of a telegraph printer 25 in the normal manner. Associated with the printer is a sequence control apparatus 26, commonly known as a stunt box, for advancing the tape, controlling page printers, recognizing address and message codes and the like. An output of the stunt box 26 may also control the operation of the distributor 20 a rotor 27 of which is designed to make one rotation for each character by structure not shown. Each time the distributor 20 impresses a character on the selector coils of the printer 25, this character is recognized in the stunt box 26 by the closure, for each marking element, of an associated contact of a group of contacts 31—31 to 35—35, inclusive. For example, if the character "Y" is impressed on the output line 16 and on the selector coils of the printer 25, since this character has the first, third and fifth elements thereof marking, the contacts 31—31, 33—33 and 35—35 in the stunt box would be closed momentarily. Also, when the carriage return (CR) function is impressed on the printer 25, not only are the contacts 34—34 closed to represent the fourth element being marking, but also contacts 36—36 in the stunt box are closed. Other contacts (not shown in FIG. 2) may be closed in the stunt box upon the selection of certain other functions. Since the operation of the stunt box is well known in the art, it will not be further described herein.

As the tape reader 15 reads the tape therein, the contacts 31—31 to 35—35, inclusive, are selectively closed thereby, and an output is impressed on a circuit 40 entitled "spiral parity check." The structure within this circuit will be described more fully hereinbelow, but for the present purposes assume only that the structure therein causes a spiral parity check of the message impressed on its input. As described hereinabove, this structure makes an odd-even count of all marks in spiral paths in the signal and controls the conditions of a series of flip-flops, designated 41 to 45, inclusive, in FIG. 2. The conditions of the flip-flops 41 to 45, inclusive, correspond to the check character to be generated (the character "K" at the end of the message shown in FIG. 1). These conditions are impressed on a second distributor 46 which is energized by suitable instrumentalities so that the check character is impressed as a serial signal over a lead 47, through the switch 11 and the output relay 22 to the output line 16. As indicated in FIG. 2, the generation of the check character is caused by the selection of a carriage return function and the closure of the contacts 36—36 in the stunt box. As shown diagrammatically in FIG. 2, an output is impressed through the switch 12 and over a lead 50 to energize the distributor 46. Other structure, not shown in FIG. 1 but which will be described more fully hereinbelow, prevents the distributor 20 from operating during this interval.

In the above manner, a signal with a check character at the end of each line is generated over the output line 16. Assume that this signal is received and, with the check character, is perforated in a second tape at the receiving end. Assume also that the system shown in FIG. 2 is at the receiving end and that the switches 10, 11 and 12 are in the "receive" positions. The second tape is placed in the receiver tape reader 15, and again the distributor 20 derives a serial signal therefrom which is impressed on the lead 21. In this case, however, since the switch 11 is in the "receive" position, no output is impressed on the output line 16. This serial signal, however, is impressed on the printer 25 and controls the contacts 31—31 to 35—35, inclusive, in the stunt box 26 in the same manner that these contacts were controlled at the transmitter. Also, the outputs of the code level contacts 31—31 to 36—36, inclusive, of the stunt box are impressed on the spiral parity check circuit 40, similar to that at the transmitter, and control the operation of similar flip-flops 41 to 45, inclusive, in the same manner as at the transmitter. Since, however, the switch 12 is in the "receive" position, when the carriage return function is selected, an output from the contacts 36—36 is now impressed over a lead 51 to a comparison circuit 52. Also, since the switch 10 is in the "receive" position, the outputs of the tape reader 15 are likewise impressed over a cable 55 to the comparison circuit 52. At the end of a line in the message, when the carriage return function is selected, the distributor 20 is de-energized, and the comparison circuit 52 is energized by the closure of the contacts 36—36. At this time, the check character being read by the tape reader 15 and the check character formed by the receiver spiral parity check circuit 40 are compared in the comparison circuit 52. Any discrepancy between these two circuits energizes an indicator 56 and, if desired, may de-energize the printer and/or notify the transmitter that an error has occurred. Suitable instrumentalities may also be provided at the receiver for suppressing the printing of the check character.

DETAILED DESCRIPTION

Transmitter

As stated hereinabove, when it is desired to transmit, a tape such as that shown in FIG. 1 is prepared and is placed in the tape reader 15. The tape reader 15 is shown schematically in FIG. 4, and each arrow in the lower group of arrows 61 to 65, inclusive, associated therewith represents a sensing pin in the reader that makes contact with an associated contact member 66 if a perforation exists in the tape at the corresponding code level. If no perforation exists, the associated sensing pin represented by an arrow in an upper group of arrows 71 to 75, inclusive, is connected to the associated contact member 66. Since the upper sensing pins are connected over a lead 76 to an armature 77 of a now-de-energized relay 80, no potential is applied to the upper sensing pins 71 to 75, inclusive, at this itme. If the number 1 element in a character is marking, however, potential from a source 81 is impressed on a front contact 82 associated with a relay 85. The relay 85 is de-energized at this time so that an armataure 86 is in the position shown in FIG. 4 and the potential being applied to the front contact 82 is applied to the armature 86 and through the sensing pin 61 to the contact member 66 associated with the number 1 element. The positive potential is then impressed over a lead 87 to another armature 91 of the relay 85 (one of a group of five armatures 91 to 95, inclusive) and a front contact 101 associated therewith (one of a group of five front contacts 101 to 105, inclusive), over a lead 106 to the number 1 segment of the distributor 20.

As the rotor 27 of the distributor 20 passes over the number 1 segment, potential is applied through a center ring 107 of the distributor 20 and over a lead 110 and to selector coils 111—111 of the printer 25 located at the transmitting station. Besides energizing the printer in the usual manner, positive potential is also impressed over a lead 112, through a front contact 115 associated with a relay 116 (now de-energized), an armature 117, and a lead 120 to one side of an operating coil 121 in the output relay 22. This circuit is completed from the other side of the coil 121, over a lead 122, an armature 125 associated with the relay 116 and a front contact 126 to ground. Consequently, a marking impulse not only energizes the printer selector coils 111—111, but is also applied to the output line 16 of FIG. 2 over output lead 127—127.

Prior to the first character's being placed into the reader 15, the rotor 27 is positioned over a "stop" segment 130 of the distributor 20, and a similar path can be traced from the source 81 of potential and through a lead 131, a lowermost armature 132 of the relay 85 and the stop segment 130 to both the selector coils 111—111 of the printer 25 and the output leads 127—127.

The only other detail of the distributor 20 which need be mentioned at this time is its start magnet. This start magnet is shown in FIG. 5 and is designated by the numeral 135. With an on-off switch 136 closed, the start magnet 135 is normally energized through a front contact 137 and an armature 138 assocaied with a relay 139 which is de-energized at this time. With the start magnet still energized, a message in the tape being read by the reader 15 is converted to a serial signal which is applied to the printer selector coils 111—111 and the output leads 127—127 in the usual manner. This normal operation continues until the end of a line is approached and the carriage return (CR) function appears in the tape. During the transmission of the line, the contacts 31—31 to 35—35, inclusive, (FIG. 3) located in the stunt box 26 are closed each time a marking element occurs in their corresponding code level. For example, referring to the tape shown in FIG. 1, the first character in the tape is the line feed function (LF). This function, number 2 element marking, causes only the contacts 32—32 in the stunt box 26 to be closed momentarily. The next character, letters, causes all five contacts 31—31 to 35—35, inclusive, to be closed momentarily also. The spiral parity check circuit 40 shown in FIG. 3 causes a spiral parity check of the characters in the tape between and including the line feed (LF) function and the carriage return (CR) function. As will be shown hereinbelow, each marking element in the tape will energize an associated flip-flop of the group of flip-flops 41 to 45, inclusive, which are shown in the upper portion of FIG. 4.

To cause the spiral parity check, each of the output stages of a cold-cathode gas-discharge stepping tube 140 is connected to and causes the energization of one of a group of five relays 141 to 145, inclusive. The stepping tube 140 may be the Western Electric 439A electron tube. This tube includes a common anode 146 and ten output cathodes 147—147 which are actually arranged in a circle but which are shown in a line in FIG. 3 for purposes of description. Located between each pair of output cathodes is a stepping cathode 150 which, when energized by a negative potential, causes switching from a given output cathode 147 to a succeeding output cathode. For example, if conduction exists between the first output cathode 147 and the anode 146, and if a negative potential of a predetermined duration is applied to the stepping cathodes 150—150 over a lead 151, conduction switches from the left output cathode 147 to the left stepping cathode 150 for the duration of the negative pulse being applied thereto. Then, at the end of the negative pulse, because of the geometrical configuration of the tube, conduction switches from the left stepping cathode 150 to the second output cathode 147 from the left. The tube is zeroed when conduction exists between the anode 146 and a "normal" cathode 152. This is accomplished upon recognition of the sequence of the carriage return and letters functions, when "LTRS" contacts 155—155 (FIG. 3) in the stunt box 26 close. When this occurs, the right side of a vacuum tube 156 is rendered conductive, the anode potential of this side drops and a negative potential is applied over a lead 157 to the normal cathode 152 to cause conduction between this cathode and the anode 146.

Thereafter, as each character is presented to the reader 15 and is printed by the printer 25, universal contacts 158—158, also located in the stunt box 26, are closed. Each closure of the universal contacts 158—158 renders conductive the left side of the tube 156. When this occurs, a negative pulse appears on the stepping cathode of the left side, over a lead 159 and to the stepping cathodes 150—150. Consequently, because of the geometric configuration of the tube, conduction switches from between the anode 146 and the normal cathode 152 to the first or left output cathode 147 in the tube. The second character being read by the reader 15 will cause the universal contacts 158—158 to close again to switch conduction to the second stage from the left in the stepping tube 146, and so forth. When the first or left-hand stage in the tube 146 is rendered conductive, a negative potential appears on the output cathode 147 associated therewith and is applied to the base of a transistor 160 which is rendered conductive thereby. When this occurs, the relay 141 associated therewith is rendered conductive, and five armatures 161—161 associated therewith are drawn up. In a similar manner, when the second stage of the stepping tube is energized, the relay 141 is de-energized, and the relay 142 is energized to draw up five armatures 162—162 associated therewith. This same action occurs when the third, fourth and fifth stages of the stepping tube 140 are rendered conductive successively. The relays 143, 144 and 145 are energized, respectively, by these three stages to draw up associated armatures 163—163, 164—164 and 165—165, respectively. Then, when the sixth stage of the stepping tube is rendered conductive, the output cathode associated therewith, being connected to the base of the transistor 160, energizes the first relay 141 for another cycle. After the completion of a line, when the carriage return-letters sequence is again selected, the contacts 155—155 again close to zero the stepping tube 140 in preparation for a new line.

As shown in FIG. 2, the contacts 31—31 to 35—35, inclusive, in the stunt box 26 are connected to the spiral parity check circuit 40 which includes the stepping tube 140 and the relays 141 to 145, inclusive. Before describing this circuit further, it will be noted in FIG. 2 that outputs are taken from the spiral parity check circuit and applied to the flip-flops 41 to 45, inclusive. These flip-flops are also shown in FIG. 4, and the flip-flop 41 is shown in detail therein. Assume that this flip-flop is in its de-energized condition as shown in FIG. 4. If the associated stunt box contact is registering a spacing impulse in the first element of the first character in the message, no potential is applied over a lead 171 (one of a group of five output leads 171 to 175, inclusive, from the circuit 40) to the flip-flop 41. If, however, the associated stunt box contact is registering a marking impulse in the first element of the first character, ground potential is applied to the lead 171, as will be described more fully hereinbelow. For the present description of the flip-flop 41, a marking condition places ground potential on the lead 171, and this ground potential is impressed through a front contact 176 associated with a relay 177 in the flip-flop 41 and through an armature 178 to the upper side of this relay. The lower side of the relay 177 is connected to a junction point 180 to which is applied a positive potential. This positive potential can be traced from the junction point 180 over a lead 181 and a lead 182 (common to all flip-flops 41 to 45, inclusive, and to which are connected similar leads 181—181 from the remaining four flip-flops 42 to 45, inclusive), a lead 185, a back contact 186 associated with a relay 187 (FIG. 5), an armature 190 associated therewith, a lead 191, contacts 192—192 associated with a manually-operated switch 195, a lead 196, an armature 197 associated with a relay 200, a back contact 201 associated with this relay to a source 202 of positive potential.

This positive potential being applied to the junction point 180 causes the relay 177 in the flip-flop 41 to be energized, but the second relay 205 in the flip-flop 41 cannot be energized at this time since the ground potential being applied to the lead 171 is not only applied through the back contact 176, the armature 178 and a diode 206 to the upper side of the relay 205, but it is also applied through an armature 207 associated with the relay 205, a front contact 210 associated therewith and a lead 211 to the lower side of the relay 205, thereby shunting the relay 205 and preventing its energization at this time. Therefore, as soon as the associated stunt box contacts are closed and ground potential is applied to the lead 171, the relay 177 is energized. When this relay is energized, an armature 212 contacts a back contact 215 associated therewith to form a locking circuit for the relay 177. This condition, that is, the relay 177 being locked in its energized condition and the relay 205 being de-energized, remains as long as the associated stunt box contacts are closed and ground is being applied thereby to the lead 171. When the associated stunt box contacts open, ground is removed from the lead 171 and, through the path including the armature 207 and front contact 210, from the lower side of the relay 205. Consequently, the positive potential being applied to the junction point 180 is applied to the lower side of the relay 205, and ground potential is applied through the armature 212 and back contact 215 of the relay 177 and through the diode 206 to the upper side of the relay 205. Therefore, the relay 205 is energized when the associated stunt box contacts open.

From the above description it can be seen that the occurrence of a single marking pulse has caused ground to be applied to the lead 171 and has caused the energization of both relays 177 and 205 in the flip-flop 41. The relays 177 and 205 will remain in their energized conditions until the receipt of a second marking impulse from a succeeding character being applied to the lead 171. When this second pulse of ground potential is applied to the lead 171, the leading edge thereof is applied through the armature 207 and a back contact 216 of the relay 205 (now energized), and over a lead 217 to the lower side of the relay 177. Since the upper side of this relay is still connected to ground through the back contact 215 and the armature 212 associated therewith, this relay is shunted and de-energized. The relay 205 remains energized, however, as long as ground potential appears on the lead 171 since, when the relay 177 is de-energized, this ground potential is supplied over the lead 171, through the front contact 176 and the armature 178 of the relay 177, and through the diode 206 to the upper side of the relay 205. Since positive potential is being applied to the junction point 180, the relay 205 will be energized at this time. As soon as the associated stunt box contacts open, ground potential is removed from the upper side of the relay 205 so that the relay 205 is de-energized when the second marking pulse disappears. Therefore, it can be seen that one marking impulse causes the energization of both relays 177 and 205, and a second marking impulse causes the de-energization of these relays. For this reason, the flip-flop 41 is referred to as an odd-even counter since an even number of marking impulses being applied thereto will result in the flip-flop being returned to its original, de-energized condition. The flip-flops 42 to 45, inclusive, operate in the same manner.

As stated hereinabove, the spiral parity check is caused by the structure shown in FIG. 3. Assuming that a first character is read in the tape reader 15, this character is transmitted over the output leads 127—127 and is impressed on the selector coils 111—111 of the printer. Each of the elements in the character that is marking causes the associated stunt box contacts 31—31 to 35—35 inclusive, to be closed. Also, as described hereinabove, this first character causes the first or left stage of the stepping tube 140 to be rendered conductive and the first relay 141 to be energized, pulling up the armatures 161—161 against back contacts 221—221. (Back contacts 222—222 to 225—225 are similarly associated with the relays 141 to 145, inclusive and respectively.) Under these conditions, and assuming that the first element in the first character is a marking impulse, ground potential designated 226 is applied through the stunt box contacts 31—31, through the upper armature 161 associated with the relay 141, the back contact 221 associated therewith, over leads 227, 230, 231 and 232 over the lead 171 to the flip-flop 41. In a similar manner, the second element of the first character is "connected" to the second flip-flop 42, and the third, fourth, and fifth elements are connected, respectively, to the flip-flops 43, 44 and 45. Then, when the second character is transmitted over the line and is impressed on the printer selector coils 111—111, the second relay 142 is energized by the second stage of the stepping tube 140 in the manner described hereinabove. In this case, the second relay 142 is energized, and the armatures 162—162 associated therewith are drawn against the back contacts 222—222.

Assume that the first signal element in the second character is a marking impulse. Then, ground potential is impressed through the stunt box contacts 31—31, through the upper armature 162 associated with the second relay 142 and the back contact 222 associated therewith, over leads 235, 236 and 237 to a lead 172 connected to the second flip-flop 42. With the second relay 142 energized, similar paths can be traced to connect the second element in the second character to the third flip-flop 43 and the third, fourth and fifth elements therein to the fourth, fifth and first flip-flops 44, 45 and 41, respectively. From this, it can be seen that the energization of the second relay 142 has "shifted" the connections of the elements in the signal to the flip-flops by one element. To cite one further example, assume that the first element in the third character is a marking impulse. In this case, the third relay 143 will be energized, and ground potential can be traced through the upper stunt box contacts 31—31, through the uppermost armature 163 and back contact 223 associated with the third relay 143, over leads 240 and 241 to the lead 173 associated with the third flip-flop 43. Also, with the third relay 143 energized, the second, third, fourth and fifth elements in the character will be connected to the fourth, fifth, first and second flip-flops, respectively. Therefore, the elements in the third character have been "shifted" still one more element with respect to their being applied to the flip-flops. With this structure, the spiral parity check disclosed in the Young application results.

Referring to the particular error detection method shown in the tape of FIG. 1, the first character punched therein is the line feed (LF) function, number 2 element marking. Since the first element in this character is "connected" to the first flip-flop 41 (the relay 141 being energized), the first character has no effect on the first flip-flop since it is a spacing element. The second element, however, is a marking element, and it energizes the second flip-flop 42. The circuit for this second element is from the ground 226, through the stunt box contacts 32—32, the second armature 161 from the top, the back contact 221 associated therewith, and leads 242, 235, 236 and 237 to the lead 172 associated with the flip-flop 42. When the next character is transmitted, the second stage of the stepping tube 140 is rendered conductive to energize the second relay 142. The second character transmitted is the letters function in which all five elements are marking. Since the second relay 142 is energized at this time, the fifth marking element in this character is applied through the closed stunt box contacts 35—35 to the input of the first flip-flop 41. The dashed-line path shown in FIG. 1 indicates the element which, if marking, affects the operation of the first flip-flop 41.

It can be seen from the above description that the five flip-flops 41 to 45, inclusive, are energized by marking impulses in five separate "spiral" paths. Referring to the single path shown in FIG. 1, if the total number of marking elements in this path is an even number, the condition of the flip-flop 41 will be the same as that initially, that is, it will be de-energized. In the message perforated in the tape of FIG. 1, it will be noted that marking elements exist, as far as the path shown in this figure is concerned in the following characters: letters, H, Q, I, C, K, B, W, F, X, J, U and space. Therefore, as far as the message in the tape of FIG. 1 is concerned, the first flip-flop 41 is energized by thirteen marking elements, and, as a consequence, the relays 177 and 205 therein will be energized at the end of the message in the line. Following the other four spiral paths, it will be found that the second, third and fourth flip-flops 42, 43 and 44 are also energized by an odd number of marking elements and the fifth flip-flop 45 by an even number. Therefore, as will now be described, the flip-flops 41, 42, 43 and 44 will remain energized, and a check character will be transmitted which has the first, second, third, and fourth elements marking, that is, the check character "K" will be transmitted at the end of the line of text following the carriage return letters sequence.

The last selection used in check character generation appearing in each line will be the carriage return (CR) function. The contacts 36—36 (FIGS. 2 and 5) are located in the stunt box 26 and are closed upon the selection of this function. When this occurs, ground potential is passed through the contacts 36—36 and through a front contact 245 and an armature 246 associated with the relay 139, energizing the relay. When the relay 139 is energized, the armature 138 and the front contact 137 open to de-energize the start magnet 135 associated with the distributor 20. The tape shown in FIG. 1 will be stopped in the reader 15 as long as the relay 135 is de-energized. Also, it will be noted at this point that a relay 247 remains de-energized because a switch 250 is in the "transmit" position. With the relay 247 energized, an armature 251 associated therewith maintains contact with a front contact 252 to maintain ground potential on a lead 255 and a junction point 256. With ground potential on the junction point 256, a relay 257 is maintained energized when the system shown in FIGS. 3 to 5, inclusive, is being used as a transmitter. The significance of this structure will be seen hereinbelow.

When the carriage return function is selected and the relay 139 is energized, a holding circuit for the relay 139 is formed through a back contact 260 and an armature 261 associated with the relay 139 and a circuit including a lead 262, a front contact 265 of a relay 266, an armature 267 associated with this relay, a lead 270, an armature 271 and a back contact 272 associated with the relay 137 to ground. Also, when the relay 139 is energized, an armature 275 closes on a back contact 276 to connect a positive potential source 277 therethrough and over a lead 280 to the upper side of the relay 116. The lower side of this relay is connected over a lead 281, through an armature 282 and a front contact 285 associated therewith, a lead 286, a front contact 287 and an armature 290 associated with the de-energized relay 247, a lead 291 and through the carriage return contacts 36—36 to ground. Consequently, the momentary closing of the carriage return contacts 36—36 energizes the relay 116. When the relay 116 is energized, a holding circuit therefor is formed over the lead 281 and through the armature 282 and a back contact 292 to ground. Therefore, the relay 116 remains energized as long as the relay 139 is energized since the positive potential 277 is now being impressed on the upper side of the relay 116 through the armature 275 and the back contact 276 associated with the relay 139.

The energizing of the relay 116 opens the output circuit of the distributor 20 and places the output of the distributor 46 on the output leads 127—127. It will be remembered that the distributor 46 is conditioned by the outputs from the flip-flops 41 to 45, inclusive, and since the flip-flops are now conditioned with the check character, "K," this structure must place the check character onto the output line. To accomplish this, when the relay 116 is energized, an armature 295 closes on a back contact 296 to open the front contact 115 and the armature 117. Since the output signal was being applied from the distributor 20, through the selector coils 111—111 over the lead 112 and through the front contact 115 and the armature 117 to the output line relay 22, the output of the distributor 20 is not only removed from the output line, but it is also shunted to ground by the closure of an armature 297 and a back contact 298 of the relay 116. At the same time, an armature 299 associated with the relay 116 closes upon a back contact 300 associated therewith to connect an output lead 301 from the distributor 46 therethrough and through the armature 125 to the lead 122 which is connected to one side of the output line relay coil 121. The other side of the coil 121 is connected over the lead 120 to the armature 117 and through the now-closed back contact 296 and armature 295 to a source 305 of positive potential. Consequently, the output of the distributor 20 has been grounded, and the output of the distributor 46 which is now conditioned by the flip-flops 41 to 45, inclusive, with the check character is applied to the output line relay 22.

As stated hereinabove, the outputs of the flip-flops 41 to 45, inclusive, condition the distributor 46 with potentials representing the check character. Referring now to FIG. 4, and more particularly to the details of the first flip-flop 41 shown therein, an output lead 311 from the first flip-flop 41 (similar to other output leads 312 to 315 associated with the flip-flops 41 to 45, respectively, is connected to a flexible and cam-actuated contact support 316 which, with a stationary contact support 317 that is connected to the output lead 301, is associated with the number 1 element in the distributor 46. Toward the end of the supports 316 and 317 are contacts 321—321 which are associated with the first element in the check character and which are normally open as are similar contacts 322—322 to 325—325, inclusive, associated with the second to fifth elements, inclusive and respectively. A pair of contacts 326—326, associated with the stop and start elements of the check character, are normally closed prior to the operation of the distributor 46. Consequently, before the distributor 46 is energized, but after the output lead 301 of the distributor 46 is connected to the output line relay 22, ground potential is applied through the normally-closed contacts 326—326 to the output lead 301. When the distributor 46 is operated by the energization of its start magnet, as will be described hereinbelow, a cam sleeve (not shown) which actuates the flexible contact supports like the support 316 first opens the contacts 326—326 to place a start element on the output line, and the contacts 321—321 through 325—325, associated with the five elements in the check character, are closed successively thereby. If any input lead such as the lead 311 to the distributor is connected to a flip-flop which is energized, ground potential will be placed on that input lead to complete the circuit to the output relay 22 and to place a marking element on the line.

As described hereinabove, the check character is the character "K" which has the first four elements therein marking. Consequently, the flip-flops 41 through 44 are energized. To illustrate how an energized flip-flop places a marking element on the output leads, when the flip-flop 41 is energized, the ground potential designated 330 (FIG. 4) is connected over a lead 331 and through a now-closed back contact 332 and armature 335 associated with the relay 177, to the input lead 311 of the distributor 46 which is associated with the number 1 element of the check character. With the contacts 321—321 closed, ground potential is applied therethrough and over the output lead 301 to the right side of line relay coil 121. Since the left side of the coil 121 is now connected over the lead 120 and through the armature 117, back contact 296 and armature 295 of the relay 116 to the positive potential source 305, a marking element is placed on the output leads 327—327.

To start the distributor 46 and to place the check character on the output line, when the carriage return contacts 36—36 are closed, ground potential is applied therethrough and over the lead 291 to the armature 290 associated with the relay 247. As stated hereinabove, this relay is de-energized since the switch 250 is in the "transmit" position so that ground potential is applied to the front contact 287 and over the lead 286 to the upper side of a relay 336. Since the lower side of this relay is connected to a positive potential, the relay 336 is energized upon the closure of the carriage return contacts 36—36. Energization of the relay 336 closes an armature 337 associated therewith to a back contact 339 to place ground potential on a pair of start magnets 340—340 associated with the distributor 46. Therefore, upon selection of the carriage return function, the distributor 20 which had been generating the message to the output relay 22 is de-energized and the distributor 46 which is conditioned by potentials representing the check character is operated to place the check character on the line.

After the check character has been placed on the output line, any of the flip-flops 41 to 45, inclusive, which are energized must be de-energized in preparation for generating a new check character from a new line of text. Referring to the flip-flop 41 shown in FIG. 4, it was stated above that positive potential is applied to the junction point 180, over the leads 181, 182 and 185, through the back contact 186 and armature 190 associated with the relay 187, over the conductor 191, through contacts 192—192 of the manually-operated switch 195, over the lead 196 and through the armature 197 and back contact 201 of the relay 200 to positive potential 202. To de-energize the flip-flops 41 to 45, inclusive, after the check character had been generated, this circuit is broken by opening the armature 197 and the back contact 201 of the relay 200. When the relay 116 was energized, an armature 341 and a front contact 342 associated therewith were opened to remove ground potential from a lead 345 which is connected to the upper side of the relay 200. The opening of this circuit de-energizes the relay 200 which is of the slow-release type. After a predetermined time, sufficient to permit the check character to be generated, the relay 200 de-energizes to open the circuit which includes the operating potential 202 to the flip-flops 41 to 45, inclusive. Therefore, the flip-flops are de-energized in preparation for a succeeding spiral parity check.

When the slow-release relay 200 de-energizes, an armature 346 and back contact 347 associated therewith open to remove ground potential from the upper side of the relay 266, also of the slow-release type. Consequently, after a second predetermined time, the relay 266 de-energizes to open the circuit including the armature 267 and the back contact 265 of the relay 266. As described previously, this circuit is included in the holding circuit for the relay 139 so that when it is disrupted, the relay 139 is de-energized. When the relay 139 is de-energized, the armature 275 and back contact 276 associated therewith open to open the circuit to the relay 116 and to de-energize it. The armature 117 and the front contact 115 of the relay 116 are again closed to place the output from the distributor 20 through the printer selector coils 111—111 again on the output relay 22, and the output of the distributor 46 which conveyed the check character to the line is removed from the line by the opening of the armature 299 and back contact 300 associated with the relay 116. Further, when the relay 116 is de-energized, the armature 341 and front contact 342 associated therewith are again closed to energize the relay 200 once more. When the relay 200 is energized, the armature 346 and back contact 347 associated therewith again close to re-energize the relay 266. Consequently, all of the structure affected when the system is used as a transmitter is returned to its initial condition in preparation of generating the next line of the signal and a check character at the end of such line.

RECEIVER

Figure 3:
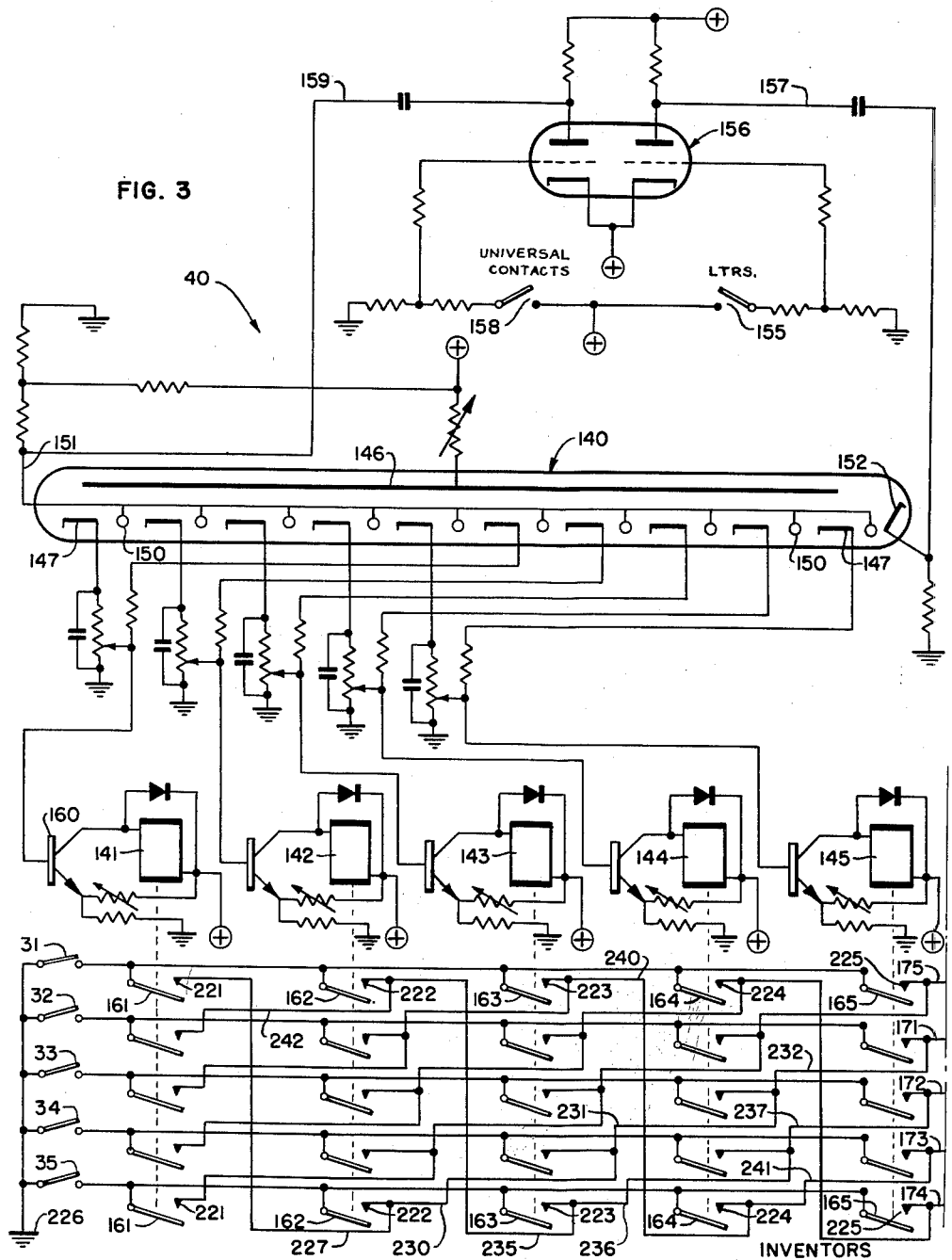
Figure 4:
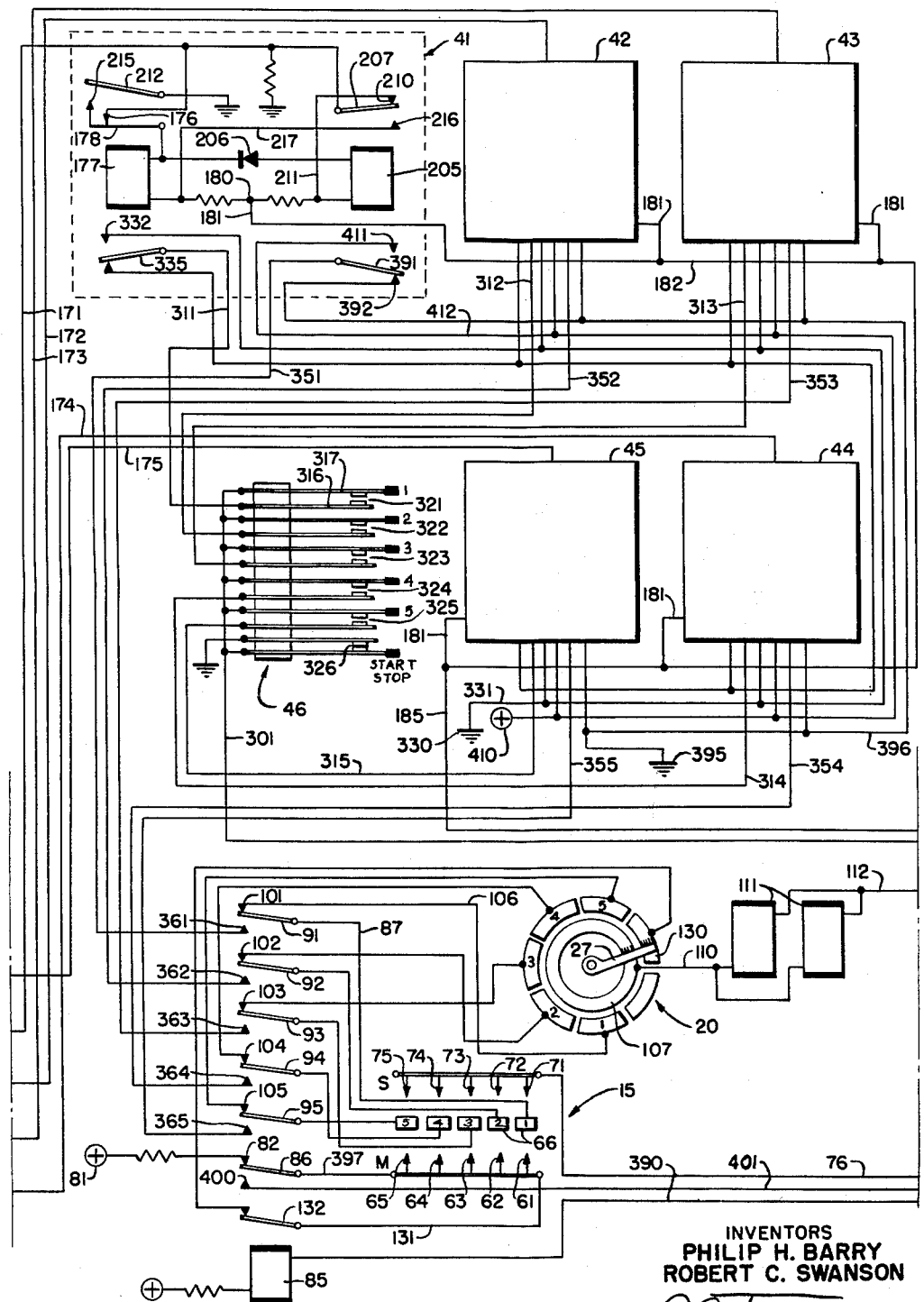
Figures 5, 6:
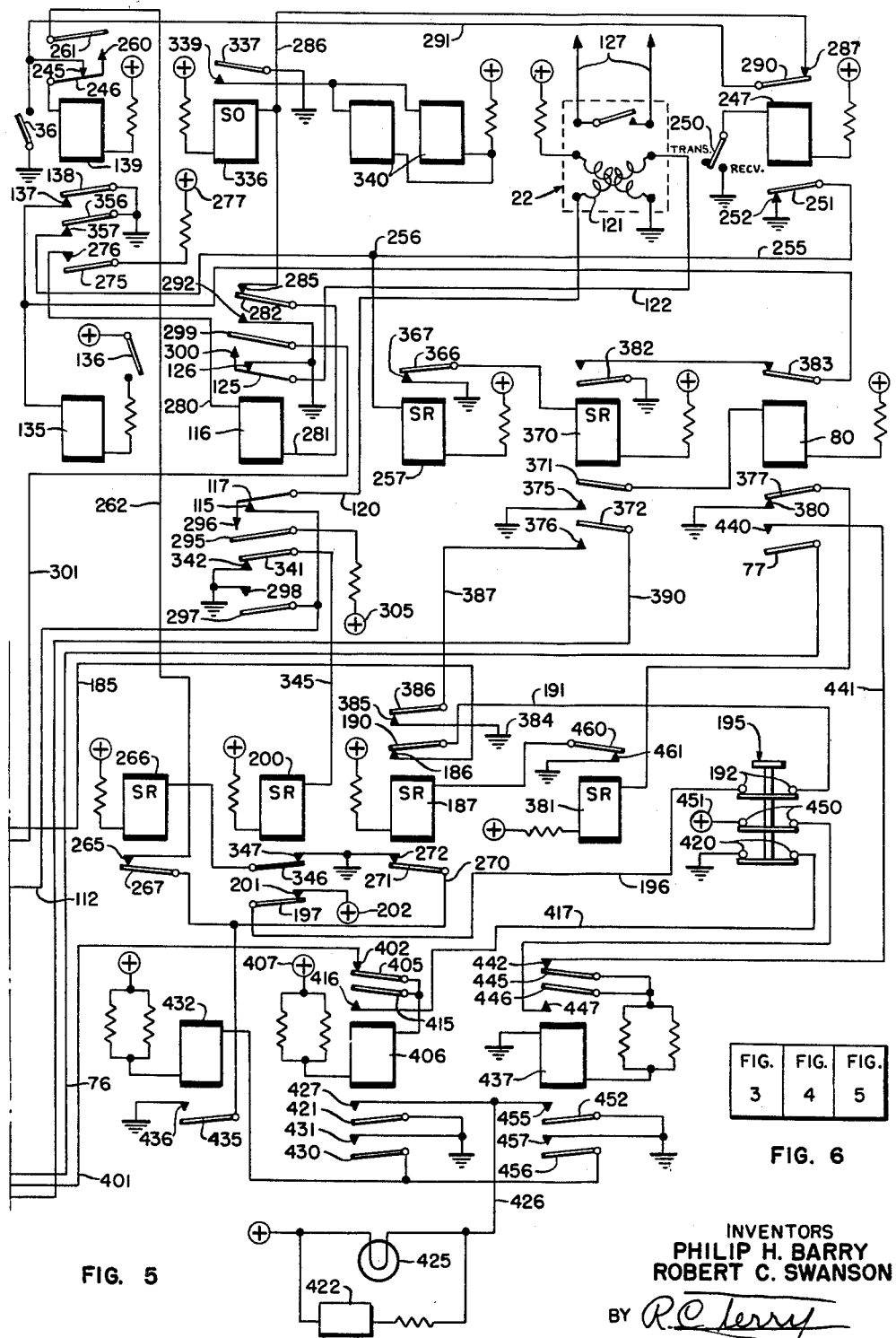

The specific embodiment of the invention shown in FIGS. 3 to 5, inclusive, is an off-line system. With this system, the signal which is applied to the output leads 127—127 is received by a reperforator at the receiving end, and a tape similar to that shown in FIG. 1 and including the check character "K" is punched into the tape. Then, the tape is placed into the reader 15 in the same manner as when the system is used as a transmitter. As will be now explained, when the system is used as a receiver, a spiral parity check of the message in the tape is again made and, instead of transmitting the locally-generated check character onto an output line, it is compared with the check character which was transmitted by the sender and punched into the tape at the receiving end. Any discrepancy between the two check characters energizes an indicator, stops the receiver and/or notifies the transmitter that an error has been made. In lieu of this off-line system, the incoming signal could be used directly on the line to generate a check character locally and to compare it with the transmitted check character.

Much of the structure in the system operates similarly whether the system is being used as a transmitter or as a receiver. For example, when the system is used as a receiver, the tape of FIG. 1 is placed in the reader 15, and a serial signal is generated by the distributor 20 and applied to the selector coils 111—111 in the receiving printer. Consequently, the signal is reproduced on the local page printer, and the stunt box contacts 31—31 to 35—35, inclusive, in the receiver are operated as each character is being reproduced. Further, the universal contacts 158—158 (FIG. 3) in the receiver operate each time a character is received and, in the same manner as described with respect to the transmitter, steps conduction of the stages in the stepping tube 140, one stage for each character. The relays 141 to 145, inclusive, in the check circuit 40, are energized successively and cause a spiral parity check of the message which is applied to the check circuit 40 by the stunt box contacts 31—31 to 35—35, inclusive, also, as in the transmitter, outputs from the check circuit 40 are applied to the flip-flops 41 to 45, inclusive, which make odd-even counts of the marking elements in spiral paths. When the system is used as a receiver, however, outputs are not taken from the flip-flops 41 to 45, inclusive, from the output leads 311 through 315 therein. Instead, outputs are taken from second output leads 351 to 355, inclusive, from the flip-flops, and these outputs, which form a locally-generated check character, are compared with the check character which appears in the tape.

When the system is used as a receiver, the switch 250 (FIG. 5) is placed in the "receive" position. This causes the relay 247 to be energized and the armature 290 and 251 to be removed from the front contacts 287 and 252, respectively. When the armature 290 and the front contact 287 are open, the energizing circuit for the start magnets 340—340 of the distributor 46 is open so that the selection of the carriage return function and the closing of the carriage return contacts 36—36 will not cause the relay 336 to be energized and the start magnets 340—340 of the distributor 46 to be operated. Consequently, the distributor 46 is disabled when the system is used as a receiver since there is to be no transmission of the check character, but only a comparison between a locally-generated and a received check character is to take place. Further, when the relay 247 is energized and the armature 251 and front contact 252 associated therewith are open, no holding ground is maintained on the junction point 256 as in the transmitter. Consequently, the relay 257 is not energized at all times as it was when the system was used as a transmitter, but rather whether or not the relay 257 is energized depends upon whether or not an armature 356 and a front contact 357 associated with the relay 139 are closed. Therefore, it will be seen that a main distinction between the system's being used as a transmitter and as a receiver is caused by the relay 257 being de-energized when the relay 139 is energized by the selection of the carriage return function. As will be presently described, the energization of the relay 247 causes a train of events which causes the comparison of the locally-generated check character and the check character which is punched into the tape being read by the reader 15.

As described hereinabove, the message punched into the tape of FIG. 1 is reproduced in the stunt box by momentary closures of the contacts 31—31 to 35—35, inclusive. The flip-flops 41 to 45, inclusive, are energized thereby and make an odd-even count of marking elements in spiral paths, and the final conditions of the flip-flops 41 to 45, inclusive, represent the check character. When the system is used as a receiver, outputs are taken from the flip-flops over the leads 351 to 355, inclusive, associated with the right relay such as the relay 205 in the flip-flop 41 and are applied to back contacts 361 to 365, inclusive, associated with the relay 85. Again, the first element in the check character is represented by the condition of the flip-flop 41, and this condition is impressed on the back contact 361 associated with the relay 85. Similarly, the condition of the flip-flop 42 is connected over the lead 352 to the next back contact 362, and so forth. Therefore, the five back contacts 361 to 365, inclusive, are energized by potentials representing the check character. How this locally-generated check character is compared to the check character being read by the reader 15 will now be described.

After a line of the message has been read by the reader 15, the carriage return function, punched in the tape, is selected. This causes the closing of the carriage return contacts 36—36 and the energization of the relay 139. Again, a holding circuit is formed for the relay 139 through the back contact 260 and the armature 261 associated therewith and over the lead 262, through the back contact 265 and the armature 267 associated with the relay 266, over the lead 270, through the armature 271 and the back contact 272 associated with the relay 187 to ground. Also, the closure of the carriage return contacts 36—36 does not energize the relay 336 because the aramture 290 and the front contact 287 associated with the relay 247 are open. Therefore, the start magnets 341—341 associated with the distributor 46 are not energized, and the distributor will not be operated. Consequently, the output leads 311 to 315, inclusive, of the flip-flops 41 to 45, inclusive, which are connected to the distributor 46 are ineffective at this time. Further, as in the case of the transmitter, when the relay 139 is energized, the armature 138 and the front contact 137 associated therewith are opened so that when the start magnet 135 associated with the distributor 20 is also de-energized.

As stated hereinabove, one difference between the operation of the system as a receiver from its operation as a transmitter is the losing of a permanent ground to the junction point 256 because of the energization of the relay 247 when the switch 250 is in its "receive" position. Consequently, ground potential will appear on the junction point 256 only when the relay 139 is de-energized through the armature 356 and the front contact 357. Upon the selection of the carriage return function, the contacts 36—36 close, the relay 139 is energized, and the armature 356 and the front contact 357 associated therewith open. This removes ground potential from the junction point 256 as long as the relay 139 is energized, and such removal causes the de-energization of the relay 257, which is of the slow-release type. After a predetermined time, an armature 366 and back contact 367 associated therewith open to open the energizing circuit to a second slow-release relay 370. After a second predetermined time, the relay 370 de-energizes, and armatures 371 and 372 associated therewith make contact with their associated front contacts 375 and 376, respectively.

When the armature 371 and the front contact 375 of the relay 370 are closed, the relay 80 is energized, and an armature 377 and front contact 380 thereof are opened to de-energize a slow-release relay 381. The significance of this structure will be apparent later. Another function caused by the relay 80 being energized quickly after the de-energization of the relay 370 is to pulse the start magnet 135 of the distributor 20 to step the tape in the reader 15 from the carriage return (CR) position to the check character position. This is accomplished by a circuit to ground from the upper side of the start magnet 135 through an armature 382 when the relay 370 is de-energized and rapidly opening this circuit by drawing up an armature 383 when the relay 80 is energized. In this manner, the check character "K" is presented to the tape reader 15.

Also, when the relay 370 de-energizes and the armature 372 and back contact 376 associated therewith close, a circuit is completed from a ground 384, through a back contact 385 and an armature 386 associated with the relay 187, over a lead 387, through the front contact 376 and the armature 372 and over a lead 390 to the upper side of the relay 85. Since the lower side of the relay 85 is connected to a positive potential, the relay 85 is energized, and all of the armatures associated therewith are pivoted downwardly into contact with their associated back contacts. As stated hereinabove, potentials representing the elements of the check character have been applied to the back contacts 361 to 365, inclusive, by the flip-flops 41 to 45, inclusive. Also, at this time the reader 15 is reading the check character in the tape that was transmitted over the output leads 127—127 of the transmitter. It will now be shown that if the locally-generated check character and the check character which was transmitted and which appears in the tape are not similar, an indicator circuit will be energized. Also, if these check characters are similar, the circuit will be returned to its original condition in preparation for the receipt of a subsequent line in the signal.

It will be remembered that the check character generated by the message shown in the tape in FIG. 1 was a character "K" with the first four elements therein marking. Assume, however, that an error was made in the transmission of the signal so that the locally-generated check character is one having a spacing condition in the first element. Consequently, the first flip-flop 41, instead of being energized for a marking condition, will register a spacing condition, that is, it will be de-energized and an armature 391 associated with the relay 205 therein will be closed upon a front contact 392. Under this condition, a ground potential 395 which is applied to a common lead 396, connected to the front contact 392 of the relay 205, is applied through the armature 391, over the lead 351, through the back contact 361 and the armature 91 associated with the relay 85, over the lead 87, through the right contact member 66 and the sensing pin 61 (reading a marking condition because of the check character in the tape), over a lead 397, through the armature 86 and a back contact 400 associated with the relay 85, over a lead 401, through a front contact 402 and an armature 405 associated with a relay 406 to the upper side of this relay. The lower side of the relay 406 is connected to a positive potential 407 so that this relay will be energized when the flip-flop 41 or any of the remaining flip-flops registers a spacing condition when it should register a marking condition.

If the flip-flop 41 were properly registering a marking condition, the positive potential being applied to the lower side of the relay 406 would be balanced by a similar positive potential 410 being applied to a back contact 411 of the relay 205 over a lead 412 connected thereto, and the relay 406 would not be energized. However, since an error exists in the check character, the relay 406 is energized, and the armatures associated therewith are drawn up. When an armature 415 is drawn up, a holding circuit is formed for the relay 406 through the armature and a back contact 416 associated with the relay 406, over a lead 417 and through contacts 420—420 in the manually-operated switch 195 to ground. Also, the drawing up of an armature 421 energizes a buzzer 422 and an indicating lamp 425 by completing a circuit over a lead 426 and through a back contact 427 and the armature 421 to ground. Further, when an armature 430 of the relay 406 is drawn up to a back contact 431, an energizing circuit through these elements is formed for a relay 432. When the relay 432 is energized, an armature 435 associated therewith closes on a back contact 436 to provide a holding ground for the relay 139 through the armature 267 and the back contact 265 associated with the relay 266 and over the lead 262. As a consequence, when an error appears in the locally-generated check character with respect to the check character transmitted over the line, the relay 432, being maintained energized, prevents the relay 139 from de-energizing and holds the start magnet 135 associated with the distributor 20 in its de-energized condition. Consequently, no further tape can be fed through the reader 15 until further action, described herein below is taken.

Assume that the first element in the check character is a spacing condition so that the sensing pin 71, associated with the spacing side of the reader 15, is closed on the right contact member 66. Assume further that the flip-flop 41, associated with the first element in the check character, is erroneously registering a marking condition. Consequently, the armature 391 associated with the relay 205 in the first flip-flop 41 will be in its upper position against the back contact 411. Under these conditions, an error of the opposite sense is being made and a relay 437 (FIG. 5) will be energized to indicate such error. The relay 437 is energized in the following manner because of the assumptions made: the positive potential 410 is passed over the lead 412 and through the back contact 411 and the armature 391 associated with the relay 205 (now erroneously in its energized or marking condition), over the lead 351, through the back contact 361 and armature 91 associated with the relay 85, over the lead 87, through the right contact member 66 and number 1 spacing sensing pin 71 in the reader 15 (in its spacing position), over the lead 76, through the armature 77 and a back contact 440 associated with the relay 80, over a lead 441, through a front contact 442 and an armature 445 of the relay 437 to the lower side of this relay and through the relay to ground. Consequently, the relay 437 is energized and the armatures associated therewith are drawn up in the same manner as those associated with the relay 406. An armature 446 and a back contact 447 being closed form a holding circuit for the relay 437 through contacts 450—450 of the manually-operated switch 195 to a source 451 of positive potential. Also, the closure of an armature 452 and back contact 455 of the relay 437 energizes the buzzer 422 and the indicator 425. Still further, and as in the case of the relay 406, closure of an armature 456 and a back contact 457 enregizes the relay 432 to maintain the relay 139 energized and to maintain the start magnet 135 associated with the distributor 20 de-energized. It can be seen, therefore, that any error between the locally-generated check character and that transmittd over the line and appearing in the tape shown in FIG. 1 will indicate an error. Also, the reader 15 and distributor 20 cannot be energized as long as their error remains indicated and the relay 432 remains energized.

To reset the circuit after an error has been indicated, the manually-operated switch 195 is depressed to open the circuits between the contacts 420—420, 450—450 and 192—192 associated therewith. When the contacts 420—420 and 450—450 are opened, the holding circuits for the relays 406 and 437 are opened, and these relays are de-energized. When the operated one of these relays is de-energized, the lower armature associated therewith drops to open the circuit to the relay 432 and to de-energize this relay. When this relay is de-energized, the armature 435 and back contact 436 associated therewith open to open the holding circuit to the relay 139. However, another holding circuit exists for this relay through the armature 271 and the back contact 272 associated with a slow-release relay 187. This circuit will be broken when the circuit to the slow-release relay 381 is opened, as described previously. When the relay 381 is de-energized, an armature 460 and a back contact 461 associated therewith open to open the circuit to the slow-release relay 187. Consequently, the armature 271 and back contact 272 associated therewith open to open all holding circuits for the relay 139. Therefore, the relay 139 is de-energized, and the closing of the armature 138 and front contact 137 associated therewith again energizes the start magnet 135 of the distributor 20. It will also be noted that when the manually-operated switch 195 opens the contacts 192—192, the operating potentials to the flip-flops 41 to 45, inclusive, are removed to de-energize these circuits. These operating potentials had been applied from the source 202 (FIG. 5) through the back contact 201 and armature 197 associated with the relay 200 (not affected during receiving operation), over the lead 196 and through the contacts 192—192 of the switch 195, over the lead 191, through the armature 190 and back contact 186 associated with the relay 187, over the common lead 185 and the leads 181—181 to all junction points similar to the junction point 180 in the flip-flop 41. When this potentail is removed, the flip-flops are de-energized and reset.

If no error had existed between the locally-generated check character and that transmitted and appearing in the tape of FIG. 1, none of the above described indicating circuits would have been energized, and the start magnet 135 of the distributor 20 would have been energized soon after the comparison of the check characters. To illustrate this operation, assume that the first flip-flop 41 in the receiver properly registers a marking impulse when the check character (K) is being read by the reader 15. In this instance, the positive potential 410 (FIG. 4) is impressed over the lead 412 and through the back contact 411 and the armature 391 of the relay 205 (now properly in its marking condition), over the lead 351 and through the back contact 361 and the armature 91 of the relay 85, over the lead 87 and through the right-hand contact member 66 and sensing pin 61 (in the marking position), over the lead 397, through the armature 86 and back contact 400 of the relay 85, over the lead 401, and through the front contact 402 and armature 405 of the relay 406 to the upper side of the relay. Since the lower side of this relay is also connected to a positive potential, the relay will not be energized and no indication of an error will be made.

The same is true if the flip-flop 41 were in a spacing condition and a spacing element were being read by the reader 15. In this case, the ground potential appearing on the upper side of the relay 437 would be balanced by a similar ground on the lower side of this relay where the latter ground (designated 395 in FIG. 4) is provided from its connection over the lead 396 and through the front contact 392 and the armature 391 of the relay 205 when this relay is in its spacing condition. In this instance, the relay 437 will not be energized and there will be no indication of an error. Therefore, when the check characters compare, the relay 432 is not energized to maintain a holding circuit for the relay 139, and this latter relay will be de-energized when the slow-release relay 187 de-energizes. When the relay 187 de-energizes, the back contact 272 and the armature 271 in the holding circuit for the relay 139 open to permit the relay 139 to de-energize and to energize again the start magnet 135 of the distributor 20. Also when the relay 187 de-energizes, the circuit providing operating potential from the source 202 to the flip-flops 41 to 45, inclusive, is opened by the opening of the armature 190 and the back contact 186 associated with the relay 187. Consequently, the flip-flops are de-energized thereby.

The structure for resetting the remaining relays in the circuit to their initial conditions is initiated when the relay 257 is energized which occurs upon the relay 139 being de-energized. When the relay 139 is again de-energized, the closure of the armature 356 and the front contact 357 associated with the relay 139 again places ground potential on the junction point 256 and on the upper side of the relay 257, energizing this relay. This action causes the relays 257 and 370 to be energized again and the relay 80 to be de-energized. When the relay 80 is again de-energized, the armature 377 and front contact 380 thereof close, and the relay 381 is again returned to its initial, energized condition thereby. Consequently, the receiver is in condition to receive a succeeding line of the signal and to perform a spiral parity check of such line.

It will be understood that this invention is not limited to the specific details described in connection with the above embodiment of the invention. It is manifest that the various modifications that may be made are within the spirit and scope of the invention.

What is claimed is:

1. Apparatus for detecting errors in the character elements of a telegraph signal, which comprises bistable circuits equal in number to the number of elements in each character, means for representing each element by either of two potentials one of which potentials is capable of actuating the bistable circuits from either stable condition to the other, and means for impressing upon each bistable circuit a potential representing a different element of each succeeding character.

2. Apparatus for detecting errors in the marking and spacing character elements of a telegraph signal, which comprises a plurality of bistable circuits equal in number of elements in the signal, means for representing each marking element in the signal by a control condition which is capable of actuating each bistable circuit from either of its stable conditions to its other stable condition and for representing each spacing element in the signal by a control condition which has no effect thereon, and means for actuating each bistable circuit according to control conditions representing a different element in each succeeding character.

3. Apparatus for detecting errors in the marking and spacing elements of a telegraph signal, which comprises a series of circuits energizable between two stable conditions, means for representing each marking element in the signal by a potential which can cause the circuits to be energized from either of their stable conditions to the other stable condition and for representing each spacing element by a potential which has no effect thereon, switching means for connecting one of two potentials representing each corresponding character element to a different circuit in the series, and means controlled by the resultant conditions of the circuits after a variable number of characters for indicating an error in the transmission of the monitored characters.

4. Apparatus for indicating errors in character elements of a telegraph signal, which comprises means for supplying either of two potentials to represent each signal element, a plurality of bistable circuits operable by one of the potentials and switching means for establishing progressively variable paths between each of the several potential supplying means and an associated bistable circuit to impress the potential representing an element in each succeeding character on a different bistable circuit.

5. Apparatus for detecting errors in the marking and spacing character elements of a telegraph signal, which comprises a plurality of bistable circuits operable between two stable conditions, means for representing each element of each character by a potential wherein the potentials representative of the marking elements are capable of operating the bistable circuits from either of their stable states to their second stable states, a plurality of relays having a number of operating pairs of contacts equal to the number of elements in the characters, means for energizing the relays successively at character intervals to close the associated pairs of contacts, conductor means connecting the potentials to one contact of each of the pairs and connecting the bistable circuits to the other contacts of each of the pairs such that the successive energization of the relays individually causes application of the potentials representing corresponding elements in successive characters to successive bistable circuits in the series, and means energized by the resultant conditions of the bistable circuits at the completion of a variable number of characters for forming an error-detecting character.

6. Apparatus for detecting errors in a multi-element telegraph signal, which comprises means for representing each marking element in the signal by one potential condition and each spacing element by a second potential condition, a stepping tube having a plurality of stages, means for actuating said stages successively at character intervals, a plurality of relays each of which is connected to one of the stepping tube stages and operated upon the activation of the associated stage, a plurality of switching means operated by each relay, a series of flip-flops operable by one of the potential conditions between two stable states and connected to the switching means, and conductor means connected to the switching means such that the successive operation of the relays by the stepping tube causes application of the potential condition associated with each element to a succeeding flip-flop in the series.

7. Apparatus for detecting errors in the marking and spacing character elements of a telegraph signal, which comprises a plurality of code element contacts closable to supply potentials representing marking conditions of the individual character elements, a plurality of bistable circuits equal in number to the number of elements in each character, a plurality of relays, means for energizing the relays individually and at character intervals, a series of armatures equal in number and corresponding to the code element contacts associated with and actuated by each relay upon the energization thereof, a contact associated with each armature and engageable by such armature upon the actuation thereof, first conductor means for connecting together all corresponding armatures in the several series of armatures, and second conductor means for connecting each of said bistable circuits to a group of contacts each associated in a different elemental order with an armature of each relay and rendered effective successively upon operation of each relay for furnishing a different control path to each bistable circuit to accomplish a change of states in the bistable circuit in response to a marking potential supplied selectively over said successively variable control paths.

8. Apparatus for detecting errors in the character elements of a telegraph signal during the transmission thereof between a transmitter and a receiver, which comprises similar bistable circuits in the transmitter and the receiver, means in the transmitter for representing each element of each message character transmitted by a potential, means for energizing each bistable circuit with the potential representing a different element in each of the succeeding message characters, means energized by the resultant conditions of the bistable circuits in the transmitter for transmitting an error-detecting character subsequent to the transmission of a predetermined number of message characters, means energized by the resultant conditions of the bistable circuits in the receiver subsequent to the receipt of the variable number of message characters and by the potentials representing the elements of the received error-detecting character for indicating any discrepancy between the resultant conditions of the bistable circuits in the transmitter and the receiver.

9. Apparatus for detecting errors in the message character elements of a telegraph signal during the transmission thereof between a transmitter and a receiver, which comprises similar bistable circuits in the transmitter and the receiver, means in the transmitter for representing each element of each message character transmitted by a potential, switching means for connecting each elemental potential representing corresponding elements of successive message characters to a different bistable circuit in the associated bistable circuits, means energized by the resultant conditions of the bistable circuits in the transmitter for transmitting an error-detecting character subsequent to the transmission of a variable number of message characters, means in the receiver for receiving the variable number of message characters, means in the receiver for energizing the bistable circuits therein by the received characters and similarly as in the transmitter, means energized by the resultant conditions of the bistable circuits in the receiver subsequent to the receipt of the variable number of message characters and by the potentials representing the elements of the error-detecting character for indicating any discrepancy between the resultant conditions of the bistable circuits in the transmitter and in the receiver.

10. Apparatus for detecting errors in a telegraph message consisting of multi-element character signals, which comprises means for transmitting each character in the message, means for transmitting a check character after a variable number of message characters have been transmitted, the last-mentioned means comprising (1) a plurality of bistable circuits having two stable conditions and equal in number to the number of elements in the message characters, (2) means for representing each element by a control condition which is capable of actuating each bistable circuit from either of its stable conditions to the other stable condition and for representing each spacing element in the signal by a control condition which has no effect thereon, (3) means for actuating each bistable circuit by the control conditions each succeeding element in each succeeding character and (4) means energized by the bistable circuits for forming a check character in accordance with the resultant conditions of the bistable circuits after actuation thereof by control conditions representing the variable number of message characters, means for receiving the message characters and the transmitted check character, means at the receiving means similar to that at the transmitting means and controlled by the received message characters for forming a check character after the variable number of message characters, and means for comparing the check character formed at the receiving means with that transmitted by the transmitting means.

11. Apparatus for detecting errors in the marking and spacing elements of a telegraph signal wherein characters are composed of a variable number of element levels, which comprises a first converter for converting each marking and spacing element in a signal to be transmitted to representative potentials, a first distributor conditioned by the potentials from the first converter for transmitting a determinable number of message signals, a first plurality of bistable circuits, first switching means connected to the first bistable circuits for energizing each bistable circuit upon the occurrence of a marking element in each different level of each succeeding message signal, a second distributor energized by the resultant conditions of the first bistable circuits for transmitting a check character after the transmission of the number of message signals, means for receiving the transmitted signals including a second converter for converting each marking and spacing element in the received signal to representative potentials, a second plurality of bistable circuits and second switching means connected between the second converter and the second bistable circuits for energizing each associated bistable circuit upon the occurrence of a marking element in each different level of each succeeding character in the received message signal, means for comparing the resultant conditions of the second bistable circuits with the potentials representative of the transmitted check character in the second converter, and means for indicating any dissimilarity in the conditions compared in the comparing means.

12. Apparatus for detecting errors in a telegraph message consisting of multi-element character signals, which comprises means for transmitting each character in the message, means for transmitting a check character after a variable number of message characters have been transmitted, the last-mentioned means comprising a plurality of bistable circuits equal in number to the number of elements in the message characters, means for representing each element by a potential, switching means for connecting each potential representing the corresponding elements of successive characters to different bistable circuits and means energized by the bistable circuits for forming a check character in accordance with the resultant conditions of the bistable circuits after energization thereof by potentials representing the variable number of message characters, means for receiving the message characters and the transmitted check character, means at the receiving means and similar to that at the transmitting means for forming a check character after each variable number of message characters, and means for comparing the check character formed at the receiving means with that transmitted by the transmitting means.

13. A tape-to-tape system for detecting, in the marking and spacing elements of characters in a telegraph signal, errors that occur during transmission between a transmitter and a receiver in the system which comprises a first tape reader at the transmitter for developing potentials representative of the marking and spacing elements in a message tape, a first distributor conditioned by the potentials of the first tape reader for transmitting a determinable number of message characters, means at the transmitter for making a spiral parity check of the predetermined number of characters, the last-mentioned means comprising (1) a plurality of bistable circuits operable between their two stable states by potentials representative of the marking elements in the signal, (2) a plurality of relays having associated therewith a group of contact pairs which are equal to the number of elements in the characters and which are closed upon the energization of the associated relay, (3) means for energizing each relay successively and individually at character intervals and (4) conductor means connecting potentials representing the elements of the predetermined number of characters to one contact of each of the pairs and connecting the bistable circuits to the other contact of each of the pairs such that the successive energization of the relays individually causes application of each potential representing a corresponding element in each successive character to different bistable circuit, a second distributor at the transmitter conditioned by output potentials from the bistable circuits for transmitting a check character after the determinable number of message characters have been transmitted, means at the receiver for receiving the transmitted signals, including the determinable number of message characters and the check character, and for punching such characters in a tape, a second tape reader at the receiver for developing potentials representative of the marking and spacing elements in the tape having the received characters punched therein, means energized by the developed potentials of the second tape reader at the receiver and similar to such means at the transmitter for making a spiral parity check of the predetermined number of received characters with the resultant conditions of the bistable circuits therein corresponding to a check character associated with the received message characters, a comparison circuit energized by output potentials from the bistable circuits at the receiver and the potentials from the second tape reader for recognizing any discrepancy between the check character in the tape made at the receiver and that formed by the spiral-parity-check means at the receiver, and an indicator energized by the comparison circuit upon the recognition of a discrepancy.

14. In a system for detecting errors in received telegraph signals wherein each signal is comprised of a predetermined number of elements which may be of marking or spacing nature, a plurality of bistable devices equal in number to the signal elements, means for representing each element of one of said natures by energy of a magnitude effective to actuate one of said bistable devices from either stable condition to the other, and means for impressing upon each bistable device, energy representing a different element of each subsequent signal.

15. In a spiral error detecting system for detecting errors in received telegraph signals wherein each signal is composed of a variable number of levels of elements of marking or spacing nature, a bistable device, means for sampling for the presence of elements of each one of said natures at a different level of each successively received signal, means for indicating the presence of elements of said one nature by energy of a magnitude effective to operate said bistable device, and means for impressing on said bistable device said energy indicative of the recognition by said sampling means of a signal element of said one nature.

16. In a spiral error detecting system for detecting errors in received telegraph signals wherein each signal is composed of a variable number of levels of elements of marking or spacing nature, a plurality of bistable devices equal in number to the signal levels, means for indicating the presence of each element of one of said natures by a potential capable of operating one of said bistable devices, and means connected to each bistable device for sampling for the presence of an element of said one nature at a different level of each successively received signal and for impressing the potential indicative of that element present in said sampling on said each bistable device, each of said sampling means conducting the sampling simultaneously and at a different level of each signal.

17. A spiral error detecting system including a tape reader for sensing the binary conditions of the elements comprising a permutational telegraphic code, recorded in tape, means for representing each element of each telegraphic code by a potential of one or the other of two magnitudes, a plurality of bistable devices operable by the application thereto of one of said potentials from either of its bistable conditions to the other, and means operable to connect each bistable device to the potential representative of an element of the telegraphic code and further operable to shift the relation between the bistable devices and the code following the registration of the elements of each code.

References Cited in the file of this patent

UNITED STATES PATENTS

| | | |
|---|---|---|
| 2,552,629 | Hamming et al. | May 15, 1951 |
| 2,688,050 | Harris | Aug. 31, 1954 |
| 2,689,950 | Bayliss et al. | Sept. 21, 1954 |
| 2,862,054 | Curtis | Nov. 25, 1958 |

UNITED STATES PATENT OFFICE
CERTIFICATION OF CORRECTION

Patent No. 3,008,007                                    November 7, 1961

Willy Petrus De Koker et al.

It is hereby certified that error appears in the above numbered patent requiring correction and that the said Letters Patent should read as corrected below.

Column 5, line 26, for "valve" read -- value --.

Signed and sealed this 10th day of April 1962.

(SEAL)
Attest:

ERNEST W. SWIDER                                      DAVID L. LADD
Attesting Officer                                         Commissioner of Patents